United States Patent [19]

Benois

[11] 4,021,220
[45] May 3, 1977

[54] FERTILIZER CONTAINING GROWTH ACTIVATORS FOR PLANTS

[75] Inventor: Jean-Claude Benois, Paris, France

[73] Assignee: Rhone-Poulenc Industries, Paris, France

[22] Filed: Dec. 8, 1975

[21] Appl. No.: 638,766

[30] Foreign Application Priority Data

Dec. 16, 1974 France .......................... 74.41308

[52] U.S. Cl. ..................................... 71/27; 71/34; 71/123
[51] Int. Cl.² ..................... C05G 3/00; A01N 9/24
[58] Field of Search ................ 71/11, 27, 123, 34, 71/25

[56] References Cited

UNITED STATES PATENTS 3,193,373   7/1965   Parups .................................. 71/123

FOREIGN PATENTS OR APPLICATIONS 27,930   7/1972   Japan .................................. 71/123

772,487   4/1957   United Kingdom ................. 71/123

OTHER PUBLICATIONS

The Condensed Chemical Dictionary, pp. 538, 605, 8th Ed., Van Nostrand Reinhold.

*Primary Examiner*—Frank A. Spear, Jr.
*Assistant Examiner*—Ferris H. Lander
*Attorney, Agent, or Firm*—McDougall, Hersh & Scott

[57] ABSTRACT

Fertilizers containing the elements nitrogen, phosphorus and potassium, and organic compounds acting as growth activators for plants. These organic compounds comprise compounds of high molecular weight, which result from the polycondensation of naphthoquinone and maleic anhydride and which are added to the fertilizers at a rate of from 0.5 to 10% by weight of the total fertilizer. Incorporation can occur at the stage of providing the raw materials or at the stage of granulation, the fertilizer thus activated being applied in known manner.

7 Claims, No Drawings

FERTILIZER CONTAINING GROWTH ACTIVATORS FOR PLANTS

The invention concerns fertilizers containing organic compounds acting as growth activators for plants.

More and more organo-mineral fertilizers are being applied, which are intended to compensate, to a certain extent, for the deficiency as regards organic elements in cultivated soils. The organic part of the ground, or humus, is a mixture of numerous organic compounds resulting from the conversion of organic residues of animal or vegetable origin.

Attempts have been made to prepare fertilizers from the substances existing in the treatment of wood. It has been proposed in particular in the process of French Patent No. 1,270,086, that wood particles should be treated by means of nitric acid, then the resulting liquid should be neutralized by a base normally used in the preparation of the fertilizers, potash, lime or ammonia, and finally, that the reaction product should be used after concentration, as a fertilizer, the fertilizing value of the potassium, calcium or ammonium nitrates, as the case may be, being indisputable.

It has long been known that humus was indispensable for vegetable growth, and work which has been done since 1931 (Ann. Agron, 1968 19(5) 553–567) has shown the positive action of humic substances on plant development. Recent studies have confirmed these results.

The chemical composition of humus was studied by many writers: FLAIG W. and HAIDER (Science du Sol 1970 2 39–72) have identified, for example, methoxy-p-quinone in soil microorganism cultures. More recently, MATHUR (Soil Science 1971 111(3) 147–157) discovered the presence of quinones, such as benzoquinone and methylnaphthoquinone in soils.

According to these latter, the humic acids, which are the most important fraction of the humus, comprise molecules in which amino acids, peptides or proteins are combined with phenols or quinones.

HAIDER et al. (Plant and Soil 1965 XXII (1) 49–64) have shown in particular that, for pH values of from 6.5 to 8, only phenols which can be oxidized to quinones are capable of combining with the above-mentioned nitrogen compounds, to give brownish compounds similar to those found in humus.

Organo-mineral fertilizers, which are capable of supplying some of the compounds of humus, amino acids in particular, are known. It was important to seek compounds capable of providing the quinones which are involved in the synthesis of humus and which are capable of having a stimulating effect on plant metabolism.

Found in the production of phthalic anhydride were compounds containing quinonic groups. Phthalic anhydride is obtained industrially by oxidation from naphthalene or orthoxylene and air, in the presence of a vanadium oxide-based catalyst fixed on an alumina carrier. The oxidation products are distilled to produce the pure phthalic anhydride. It is known that beside the pthalic anhydride, some naphthoquinone is formed, the sublimation point thereof being very close to that of phthalic anhydride; it is separated by bringing it into contact with maleic anhydride. Polycondensation products of high molecular weight, which are relatively easy to separate from phthalic anhydride, are primarily formed.

It has been found that the above compounds, besides small amounts of phthalic anhydride, contain quinonic groups and that they act as growth activators on plants.

The fertilizers according to the present invention contain the elements nitrogen, phosphorus and potassium, and they also contain, in an amount which is generally from 0.5 to 10% by weight of the total, compounds of high molecular weight resulting from the polycondensation of naphthoquinone and maleic anhydride.

The amount of these latter compounds is preferably of the order of 1% by weight.

These compounds can be added to all the current forms of fertilizers, in particular those which contain the elements nitrogen, phosphorus and potassium, in particular such elements in respective amounts such that, for 100 kg of fertilizer, the nitrogen expressed in the total nitrogen form is of the order of 4, the phosphorus expressed in the form $P_2O_5$ is of the order of 8 and potassium expressed in the form of $K_2O$ is of the order of 12.

The fertilizers of the invention advantageously comprise organic compounds containing organic nitrogen. They contain for example 3% by weight of ammoniacal nitrogen and 1% of organic nitrogen. The ammoniacal nitrogen is in most cases in the form of ammonium phosphate and/or ammonium sulphate. In practice the organic nitrogen often results from the products of solubilization, by concentrated sulphuric acid, of dried untanned hides. The phosphorus in most cases is provided as a superphosphate.

The products of polycondensation of naphthoquinone and maleic anhydride are generally in the form of powders or granules.

They are used by first reducing them to the form of substantially dry powder which is suitably divided, for example by crushing, and then they are incorporated in the mineral raw materials by any per se known mixing means. Incorporation can occur, for example, at the stage of provision of the raw materials, or at the stage of granulation, as required. Application of the material as fertilizer is carried out in any known manner.

The fertilizers containing organic nitrogen are preferably produced in the following per se known manner:

The dried untanned hides are first dissolved in concentrated sulphuric acid. A liquor is produced, analysis of which gives the following:

| | | |
|---|---|---|
| organic N | in g/l | 53.75 |
| total $H_2SO_4$ | in g/l | 564.1 |
| free $H_2SO_4$ | in g/l | 511.4 |
| combined $H_2SO_4$ | in g/l | 52.7 |
| specific gravity | in g/l | 1372.0 |

The liquor is then mixed with some ammonium sulphate, superphosphate and potassium chloride or sulphate, at a rate of 1 unit of organic nitrogen for 3 units of ammoniacal nitrogen of the ammonium sulphate.

A drying operation is carried out, in the course of which a certain amount of ballast is added, to make up the weight to 100 kg.

The effect of activation of plant growth is demonstrated by the following examples, which are given by way of illustration and not limitation, of application of the fertilizers of the invention.

EXAMPLE 1

1% of product of high molecular weight in the form of powder and containing primarily the products of polycondensation of maleic anhydride and napthoquinone is added to a known mineral fertilizer having the formula NPK 4-8-12. The mixture is agitated for a period of 3 hours. A test is carried out in a "RIVIERA" pot (RIVIERA is a registered trade mark) on lettuces of the variety "AMANDA +".

Each pot receives 14 kg of earth and the amount of activated 4-8-12 fertilizer prepared above, corresponding to an addition of 1000 kg/ha in open ground, that is to say, 40-80 and 120 units per hectare of the respective fertilizing elements N, $P_2O_5$ and $K_2O$.

While carrying out the test, each pot receives an amount corresponding to 50 units of nitrogen per hectare, in the form of 33.5% ammonium nitrate, 15 days after transplanting the lettuces, followed by a fresh application of 25 units per hectare of nitrogen in the form of 33.5% ammonium nitrate, at a fortnight to three weeks after the preceding application. The number of repetitions for each treatment is 4.

When picked, the lettuce is weighed and then dried in order to obtain the dry weight.

The average of the 4 repetitions is taken and the following results are obtained, as shown in Table 1.

TABLE 1

| TREATMENT | LETTUCE AMANDA + | |
|---|---|---|
| | Weight of fresh matter (g) | Weight of dry matter (g) |
| Organo-mineral 4-8-12 based on dried untanned hides | 150.99 | 8.08 |
| Mineral 4-8-12 + 1% of products of polycondensation of naphthoquinone and maleic anhydride | 174.57 | 9.05 |

EXAMPLE 2

A fertilizer is prepared which contains, per 100 g, the following:

4 kg of nitrogen including 1 kg of organic nitrogen originating from dried hides and formed by products of degradation thereof; primarily amino acids and 3 kg of ammoniacal nitrogen originating from ammonium sulphate, 8 kg of phosphoric anhydride $P_2O_5$ in the form of superphosphate, 12 kg of potash expressed in the form of $K_2O$, originating from potassium chloride.

1% of product of high molecular weight, in powder form, resulting from the polycondesation of maleic anhydride and naphthoquinone, is added to the fertilizer having the formula NPK 4-8-12 produced as above. The mixture is agitated for a period of 3 hours.

Two tests are carried out in RIVIERA pots (RIVIERA is a registered trade mark) on lettuces of the varieties "AMANDA" and AMANDA +.

Each pot receives 14 kg of earth and an amount of activated 4-8-12 fertilizer prepared as above, corresponding to an addition of 1000 kg/ha on open ground, that is to say, 40-80 and 120 units per hectare of the respective fertilizing elements N, $P_2O_5$ and $K_2O$.

During the test, each pot receives 50 units of nitrogen in the form of 33.5% ammonium nitrate, a fortnight after transplantation of the lettuces, followed by a fresh application of 25 units per hectare of nitrogen in the form of 33.5% ammonium nitrate, a fortnight to 3 weeks after the preceding application. The number of repetitions for each treatment is 4.

Upon being picked, the lettuces are weighed and then dried in order to obtain the dry weight.

The average of the four repetitions is taken, and the following results as shown in Table 2 are obtained.

| TREATMENT | TEST NO. 1 (LETTUCE AMANDA) | | TEST NO. 2 (LETTUCE AMANDA +) | |
|---|---|---|---|---|
| | Weight of fresh matter(g) | Weight of dry matter(g) | Weight of fresh matter(g) | Weight of dry matter(g) |
| Reference without fertilizer | 39.68 | 1.99 | 25.99 | 1.68 |
| Organo-mineral 4-8-12 based on dried untanned hides | 59.08 | 3.17 | 150.99 | 8.08 |
| Organo-mineral 4-8-12 based on dried untanned hides + 1% of products of polycondensation of maleic anhydride and naphthoquinone | 73.39 | 3.68 | 173.75 | 8.60 |

I claim:

1. Fertilizers containing the elements nitrogen, phosphorus and potassium, characterized in that they also contain 0.5 to 10% by weight of compounds of high molecular weight resulting from the polycondensation of naphthoquinone and maleic anhydride.

2. Fertilizers as claimed in claim 1 in which the compounds of high molecular weight are present in the order of 1% by weight of the total fertilizer.

3. Fertilizers as claimed in claim 1 characterized in that they contain the elements NPK in which N, expressed in the form of total nitrogen, is of the order of about 4, P, expressed in the form of $P_2O_5$, is of the order of about 8, and K, expressed in the form of $K_2O$, is of the order of about 12.

4. Fertilizers as claimed in claim 3 in which the nitrogen comprises about 3% by weight of ammoniacal nitrogen and about 1% by weight of organic nitrogen.

5. Fertilizers as claimed in claim 4 in which the ammoniacal nitrogen is in the form of an ammonium salt selected from the group consisting of ammonium phosphate and ammonium sulphate.

6. Fertilizers as claimed in claim 4 in which the organic nitrogen comprises the product of solubilization and dried untanned hides with sulphuric acid.

7. A process for preparing fertilizers of claim 1 comprising reducing the organic products containing compounds of high molecular weight which result from the polycondensation of naphthoquinone and maleic anhydride to the form of a substantially dry powder, and then incorporating the powder in the mineral raw materials forming the remainder of the fertilizer.

* * * * *